US010659680B2

(12) United States Patent
Byon et al.

(10) Patent No.: US 10,659,680 B2
(45) Date of Patent: May 19, 2020

(54) METHOD OF PROCESSING OBJECT IN IMAGE AND APPARATUS FOR SAME

(71) Applicant: Electronics and Telecommunications Research Institute, Daejeon (KR)

(72) Inventors: Sung Won Byon, Seongnam-si (KR); Eun Jung Kwon, Daejeon (KR); Hyun Ho Park, Daejeon (KR); Yong Tae Lee, Daejeon (KR); Dong Man Jang, Sejong-si (KR); Eui Suk Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/125,377

(22) Filed: Sep. 7, 2018

(65) Prior Publication Data
US 2019/0116310 A1 Apr. 18, 2019

(30) Foreign Application Priority Data
Oct. 18, 2017 (KR) .................. 10-2017-0135370

(51) Int. Cl.
*H04N 5/232* (2006.01)
*G06K 9/00* (2006.01)
(Continued)

(52) U.S. Cl.
CPC ..... *H04N 5/23219* (2013.01); *G06K 9/00335* (2013.01); *G06K 9/00369* (2013.01);
(Continued)

(58) Field of Classification Search
CPC .......... G06K 2209/21; G06K 9/00335; G06K 9/00369; H04N 5/23219; H04N 5/247; H04N 7/181
See application file for complete search history.

(56) References Cited

U.S. PATENT DOCUMENTS 7,054,415 B2 * 5/2006 Beere ............... G08B 13/19656
348/143
8,508,580 B2 * 8/2013 McNamer .............. G03B 35/06
348/43
(Continued)

FOREIGN PATENT DOCUMENTS

JP     2010206405 A    9/2010
KR    101401299 B1    5/2014
(Continued)

OTHER PUBLICATIONS

Sungwon Byon et al., "A Study on Location Information Aided Re-identification in CCTV Environment", International Conference on ICT Convergence 2017, pp. 818-820, IEEE.

*Primary Examiner* — Peter D Le
(74) *Attorney, Agent, or Firm* — William Park & Associates Ltd.

(57) ABSTRACT

Disclosed is a method of processing an object in an image and a system for the same. According to an embodiment of the present disclosure, there is provided a method of processing an object in an image, the method including: detecting a first object from a first image obtained by a first network camera; detecting a second object from a second image obtained by a second network camera; checking similarity between the first and second objects in consideration of feature information of the first and second objects, installation location information of the first and second network cameras, and location information of a terminal device; and determining whether the first object is equal to the second object on the basis of the similarity between the first and second objects.

14 Claims, 5 Drawing Sheets

(51) Int. Cl.
*H04N 5/247* (2006.01)
*H04N 7/18* (2006.01)

(52) U.S. Cl.
CPC ............ *H04N 5/247* (2013.01); *H04N 7/181* (2013.01); *G06K 2209/21* (2013.01)

(56) References Cited

U.S. PATENT DOCUMENTS

| | | | | |
|---|---|---|---|---|
| 8,612,478 B1* | 12/2013 | Duong | ................ | G06F 16/9537 707/770 |
| 10,033,992 B1* | 7/2018 | McGowan | ........... | H04N 13/361 |
| 10,034,049 B1* | 7/2018 | Deephanphongs | ......................... | H04N 21/44218 |
| 10,126,812 B2* | 11/2018 | Miller | ................... | G06T 19/006 |
| 10,354,232 B2* | 7/2019 | Tomlin, Jr. | | |
| 2002/0025825 A1* | 2/2002 | Hirayama | ................ | H04N 7/18 455/457 |
| 2002/0048054 A1* | 4/2002 | Ohata | ..................... | G06F 16/54 358/500 |
| 2002/0099763 A1* | 7/2002 | Kondo | ................ | G06Q 30/02 709/201 |
| 2002/0123839 A1* | 9/2002 | Iwase | ................ | G09B 29/106 701/468 |
| 2002/0167587 A1* | 11/2002 | Ogasawara | ............ | H04N 7/183 348/89 |
| 2003/0100316 A1* | 5/2003 | Odamura | ................ | H04L 67/36 455/456.1 |
| 2004/0001148 A1* | 1/2004 | Takemoto | .......... | H04N 1/00137 348/211.8 |
| 2004/0160325 A1* | 8/2004 | Yamashita | ............ | G06Q 10/10 340/573.1 |
| 2004/0247205 A1* | 12/2004 | Nagaya | .................... | H04N 5/76 382/305 |
| 2005/0254686 A1* | 11/2005 | Koizumi | ............. | G06K 9/6203 382/103 |
| 2006/0158534 A1* | 7/2006 | Gotohda | ................ | H04N 5/232 348/239 |
| 2006/0220843 A1* | 10/2006 | Broad | ................. | G08B 25/009 340/539.23 |
| 2007/0088497 A1* | 4/2007 | Jung | ................ | G01C 21/3647 348/113 |
| 2007/0160365 A1* | 7/2007 | Aoyagi | ................ | G06F 16/583 396/429 |
| 2010/0149335 A1* | 6/2010 | Miller, II | ............... | H04N 7/181 348/148 |
| 2010/0214400 A1* | 8/2010 | Shimizu | ................ | G06F 3/0346 348/77 |
| 2013/0127591 A1* | 5/2013 | Shay | .................. | G07C 9/00087 340/5.52 |
| 2013/0259308 A1* | 10/2013 | Klusza | ............... | G06K 9/00624 382/103 |
| 2013/0271607 A1* | 10/2013 | Takahashi | ................. | G01S 5/16 348/148 |
| 2013/0286048 A1* | 10/2013 | Sternitzke | ............. | G06Q 10/06 345/633 |
| 2013/0325887 A1* | 12/2013 | Takaoka | ................ | G06F 16/27 707/758 |
| 2014/0307096 A1* | 10/2014 | Park | ................... | G08B 13/1672 348/152 |
| 2014/0375818 A1* | 12/2014 | Lee | ........................ | H04N 7/181 348/159 |
| 2015/0139058 A1* | 5/2015 | Xia | ................ | G06K 9/00832 370/311 |
| 2016/0014305 A1* | 1/2016 | Schlattmann | ....... | G06K 9/00758 348/515 |
| 2017/0280105 A1* | 9/2017 | Malik | .................... | H04N 7/181 |
| 2018/0295582 A1* | 10/2018 | Xia | .................... | G06K 9/00832 |

FOREIGN PATENT DOCUMENTS

| | | |
|---|---|---|
| KR | 1020140090795 A | 7/2014 |
| KR | 101530355 B1 | 6/2015 |

* cited by examiner

METHOD OF PROCESSING OBJECT IN IMAGE AND APPARATUS FOR SAME

CROSS REFERENCE TO RELATED APPLICATION

The present application claims priority to Korean Patent Application No. 10-2017-0135370, filed Oct. 18, 2017, the entire contents of which is incorporated herein for all purposes by this reference.

BACKGROUND OF THE INVENTION

Field of the Invention

The present disclosure relates generally to a security system of a closed circuit TV. More particularly, the present disclosure relates to a method of detecting an object in an image obtained by a closed circuit TV and an apparatus for the same.

Description of the Related Art

Conventionally, general CCTV cameras, etc. perform only a function of photographing a predetermined region and transmitting an image thereof. Recently, with the development of the related technology, an intelligent image analysis system has been developed such that an analysis operation, such as distinguishing objects in obtained images, etc., is possible.

Such a technology of analyzing an image, for example, a technology of extracting objects in obtained images and classifying the objects according to features has been increasing in accuracy with the development of machine learning technology. Recently, a technology of classifying objects, such as people, vehicles, animals, buildings, traffic lights, etc., in the obtained image according to the type or determining whether they are the same object has been studied.

Furthermore, a technology of detecting an object corresponding to a human in an image is used in various application technical fields for crime prevention or security.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a method of processing an object in an image and an apparatus for the same, the method and apparatus being capable of accurately detecting and tracking an object corresponding to a human in an image.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of processing an object in an image, the method including: detecting a first object from a first image obtained by a first network camera; detecting a second object from a second image obtained by a second network camera; checking similarity between the first and second objects in consideration of feature information of the first and second objects, installation location information of the first and second cameras, and location information of a terminal device; and determining whether the first object is equal to the second object on the basis of the similarity between the first and second objects.

According to another aspect of the present disclosure, there is provided a system for processing an object in an image, the system including: a first network camera obtaining a first image; a second network camera obtaining a second image; a camera information management unit managing installation location information indicating locations where the first and second network cameras are installed; an object information management unit detecting a first object from the first image and a second object from the second image; a terminal location information management unit storing and managing terminal location information indicating a location of a terminal device; and a same object management unit checking similarity between the first and second objects in consideration of feature information detected from the first and second objects, the installation location information of the first and second network cameras, and the terminal location information, the same object management unit determining whether the first object and the second object are the same object on the basis of the similarity between the first and second objects.

It is to be understood that the foregoing summarized features are exemplary aspects of the following detailed description of the present disclosure without limiting the scope of the present disclosure.

According to the present disclosure, it is possible that the method and apparatus being capable of accurately detecting and tracking an object corresponding to a human in an image is provided.

Effects that may be obtained from the present disclosure will not be limited only to the above-described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, exemplary embodiments of the present disclosure will be described in detail with reference to the accompanying drawings.

Figure 1:
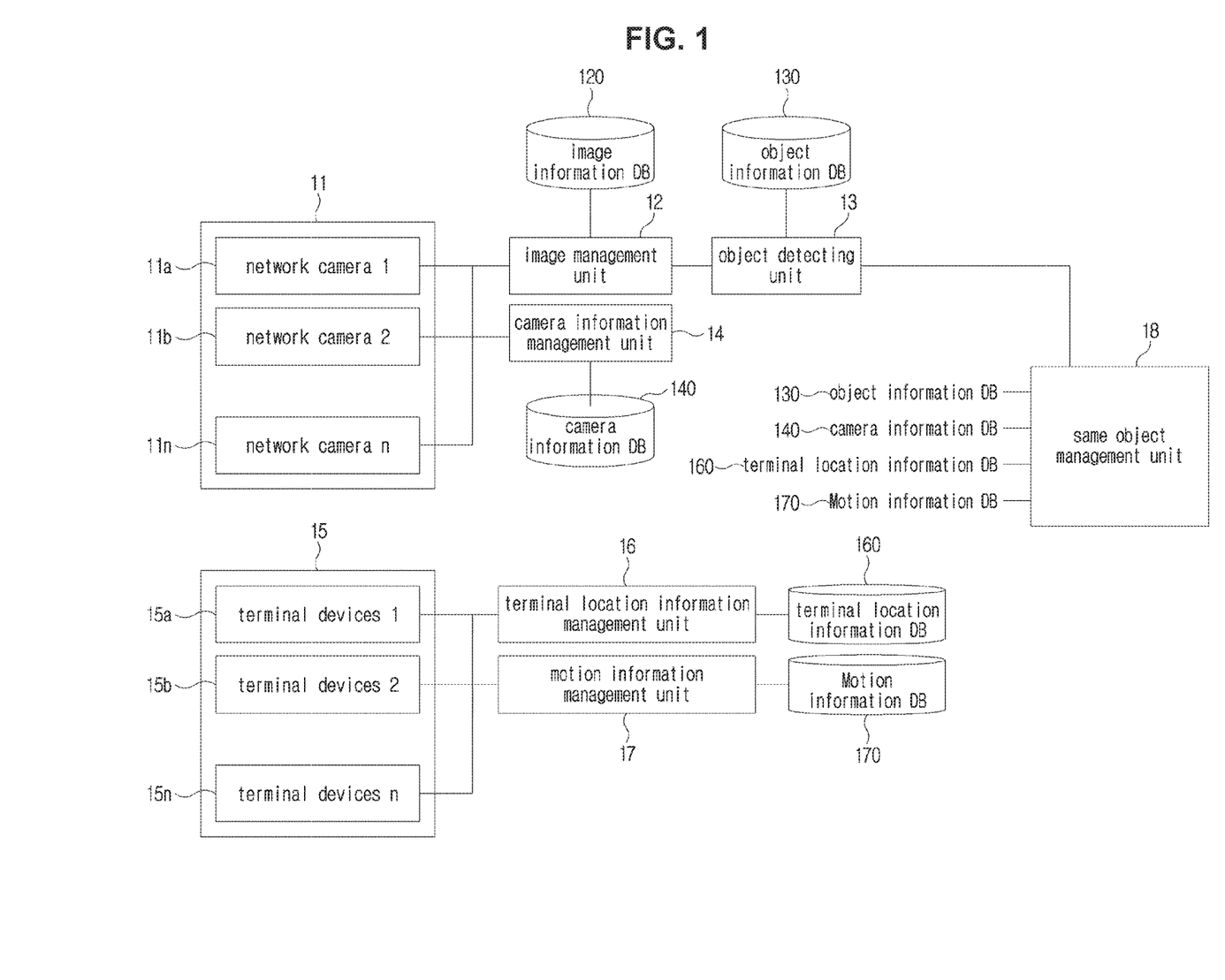
FIG. 1 is a schematic diagram illustrating a configuration of a system for processing an object in an image according to an embodiment of the present disclosure.

FIG. 1 is a schematic diagram illustrating a configuration of a system for processing an object in an image according to an embodiment of the present disclosure.

Referring to FIG. 1, the system 10 for processing the object in the image may include: multiple network camera devices 11, an image management unit 12, an object detecting unit 13, a camera information management unit 14, multiple terminal devices 15, a terminal location information management unit 16, and a same object management unit 18. Also, the system 10 for processing the object in the image may include an image information DB 120, an object information DB 130, a camera information DB 140, and a terminal location information DB 160.

Each of the multiple network camera devices 11 may include: a photographing unit obtaining an image; and a communication unit constructing a predetermined data packet containing the obtained image, and transmitting the data packet to the image management unit 12 via a network.

The image management unit 12 may be connected to the multiple network camera devices 11 via a wired/wireless network, and may store the obtained images provided from the multiple network camera devices 11 in the image information DB 120 in real time for management.

The object detecting unit 13 detects an object in a preset pattern using the image stored in the image information DB 120, and stores the detected object in the object information DB 130 for management. For example, the object detecting unit 13 may check a pattern corresponding to a human in an image, may detect a human object from the image, and may store the image on a per-human object basis by assigning an identifier to each detected human object. Here, the object detecting unit 13 may also store time information related to the time when the relevant image is obtained. Further, the object detecting unit 13 may also store an identifier of a network camera that has obtained the image.

Also, the object detecting unit 13 may generate object analysis information by analyzing the extracted object, and may store the object analysis information in the object information DB 130. The object analysis information may contain information related to appearance of the human object. For example, the object analysis information may contain the color of the top clothing, the color of the bottom clothing, whether a hat is worn, the color of the hat, etc. with respect to the human object. Also, the object analysis information may contain information related to gestures of the human object (e.g., gesture information) which may be classified into, for example, falling down, stopping, pacing around, quick moving, etc.

The camera information management unit 14 may store information related to a network camera in the camera information DB 140 for management. For example, the camera information DB 140 may contain a network camera identifier, installation location information indicating the location where the network camera is installed, etc.

The multiple terminal devices 15 are small terminal devices carried by users, and each of the multiple terminal devices may include: a location information check module capable of checking the location of the device, similar to the GPS, etc.; and a communication module capable of transmitting the checked location information to an external terminal, a server, etc. via a wired/wireless communication network. For example, the multiple terminal devices 15 may include a mobile phone, a smartphone, a notebook computer, a terminal device for digital multimedia broadcasting, a personal digital assistant (PDA), a portable media player (PMP), a navigation device, etc.

The terminal location information management unit 16 may store information for managing the multiple terminal devices 15 and terminal location information indicating the location of the terminal device in the terminal location information DB 160 for management. The terminal location information DB 160 may contain a terminal identifier, the location information of the terminal device obtained on a per-preset time basis, etc.

The same object management unit 18 checks similarity between objects stored in the object information DB 130 in consideration of feature information of the objects stored in the object information DB 130, the installation location information of the network camera corresponding to the object, the location information of the terminal device, etc., and determines whether the objects stored in the object information DB 130 are the same object on the basis of the checked similarity.

For example, the same object management unit 18 extracts a first object and a second object, which are obtained in different images, from the object information DB 130, and checks feature information of the first object and of the second object to check similarity between two objects. When the similarity which is checked on the basis of the feature information of the first object and the second object is equal to or greater than a preset threshold value, the first object and the second object are likely to be the same object, and thus the same object management unit 18 detects the installation location information related to the first object and the second object from the camera information DB 140. Also, the same object management unit 18 may detect, on the basis of the photographing time of the first object and the second object and the installation location information of the first object and the second object, a terminal device (e.g., a first terminal device) corresponding to location detection time and terminal location information from the terminal location information DB 160. When it is checked that the installation location information of the first object is similar to the terminal location information of the first terminal device at the time corresponding to the photographing time of the first object and the installation location information of the second object is similar to the terminal location information of the first terminal device at the time corresponding to the photographing time of the second object, the same object management unit 18 determines that the first object is highly related to the second object, and the first object and the second object are managed as the same object. In contrast, when the installation location information of the first object is similar to the terminal location information of the first terminal device at the time corresponding to the photographing time of the first object but the installation location information of the second object is not similar to the terminal location information of the first terminal device at the time corresponding to the photographing time of the second object, it is determined that the first object is unrelated to the second object, and the first object and the second object are managed as different objects.

Also, the terminal location information management unit 16 may store movement information indicating movement of the terminal device in the terminal location information DB 160. The movement information may include a sensor value obtained by a movement sensor or may include movement operation information, etc. that the type of movement is detected on the basis of the sensor value. The movement information may be generated, retained, and managed by a movement information management unit 17 separated from the terminal location information management unit, and may be stored in a movement information DB 170.

As another example, the movement information may be included in the movement information management unit 17 separated from the terminal location information management unit 16, the movement information management unit 17 may generate the movement information including a sensor value obtained by a movement sensor or including movement operation information that the type of movement is detected on the basis of the sensor value, etc., and may store the information in the movement information DB 170.

Considering this, the same object management unit 18 may use the movement information to determine whether the first object is the same as the second object. For example, the same object management unit 18 may use the gesture information stored in the object information DB 130 and the movement information stored in the terminal location information DB 160 to calculate feature information similarity of the first object and the second object. Also, in calculating the similarity between the installation location information and the terminal location information, the same object management unit 18 may also apply the gesture information of the relevant object and the movement information of the terminal device to calculate the similarity.

Hereinafter, operation of the system for processing the object in the image will be described in detail.

Figure 2:
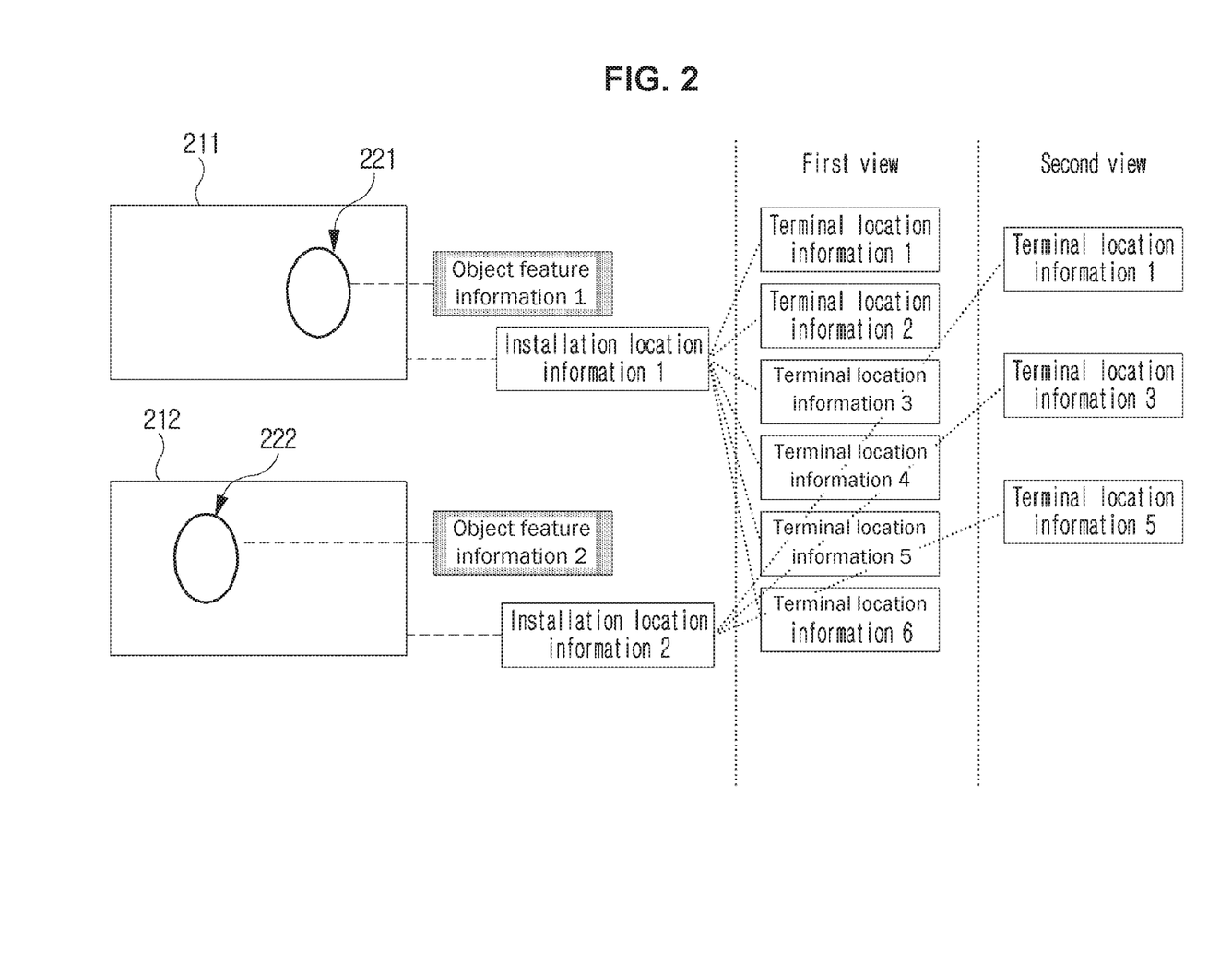
FIG. 2 is a diagram illustrating an example of operation of a system for processing an object in an image according to an embodiment of the present disclosure.

FIG. 2 is a diagram illustrating an example of operation of the system for processing the object in the image according to an embodiment of the present disclosure.

The object detecting unit 13 may detect the first object 221 from a first image 211 obtained by a first network camera device 11*a*, and may detect the second object 222 from a second image 212 obtained by a second network camera device 11*b*. First object information and second object information on the detected first object 221 and second object 222 may be stored in the object information DB 130.

The detected first object 221 and second object 222 may be the same object, or may be different objects. Accordingly, the same object management unit 18 checks the feature information of the first object 221 and the second object 222 first, and calculates the similarity between the first object 221 and the second object 222.

For example, images on a per-object basis corresponding to the first object 221 and the second object 222 may be stored in the object information DB 130. In this case, the same object management unit 18 may detect the feature information of the first object 221 and the feature information of the second object 222 from the images on a per-object basis, and may calculate the similarity between the detected feature information of the first object 221 and the detected feature information of the second object 222.

As another example, the feature information of the first object 221 and the second object 222 may be stored in the object information DB 130. In this case, the same object management unit 18 checks the feature information stored in the object information DB 130, and calculates the similarity between the first object 221 and the second object 222.

When the similarity between the first object 221 and the second object 222 exceeds the first preset threshold value, the same object management unit 18 uses the location information to determine whether the first object 221 and the second object 222 are the same object.

Specifically, the same object management unit 18 checks the installation location information of the first network camera 11*a* corresponding to the first object 221 from the camera information DB 140. Also, the same object management unit 18 checks at least one piece of terminal location information detected at the same time (or similar time) based on the photographing time of the first object 221 from the terminal location information DB 160.

Similarity (e.g., first location information similarity) between at least one piece of terminal location information and the installation location information of the first network camera 11*a* is calculated. The same object management unit 18 checks whether the first location information similarity exceeds a second preset threshold value, and extracts at least one terminal device in which the first location information similarity exceeds the second preset threshold value.

After, the same object management unit 18 extracts terminal location information corresponding to the photographing time of the second object 222 among the terminal location information of at least one terminal device which is extracted. The same object management unit 18 calculates similarity (e.g., second location information similarity) between the extracted terminal location information and the installation location information of the second network camera 11b. The same object management unit 18 checks whether the second location information similarity exceeds a third preset threshold value, and determines that the first object 221 and the second object 222 are the same object, when the second location information similarity exceeds the third preset threshold value.

Further, the same object management unit 18 uses the terminal location information stored in the terminal location information DB 160 as well as the gesture information stored in the object information DB 130 and the terminal movement information stored in the movement information DB 170 to determine whether the first object 221 is the same as the second object 222.

Specifically, the same object management unit 18 checks the installation location information of the first network camera 11a corresponding to the first object 221 from the camera information DB 140. Also, the same object management unit 18 checks at least one piece of terminal location information detected at the same time (or similar time) based on the photographing time of the first object 221 from the terminal location information DB 160.

Similarity (e.g., first location information similarity) between at least one piece of terminal location information and the installation location information of the first network camera 11a is calculated. Here, the same object management unit 18 may further extract gesture information of the first object 221 and the terminal movement information corresponding to at least one terminal. Further, by further applying similarity between the gesture information of the first object 221 and the terminal movement information corresponding to at least one terminal, the first location information similarity may be calculated.

After, the same object management unit 18 checks whether the first location information similarity exceeds the second preset threshold value, and extracts at least one terminal device in which the first location information similarity exceeds the second preset threshold value.

Next, the same object management unit 18 extracts terminal location information corresponding to the photographing time of the second object 222 among the terminal location information of at least one terminal device which is extracted. The same object management unit 18 calculates similarity (e.g., second location information similarity) between the extracted terminal location information and the installation location information of the second network camera 11b. Here, the same object management unit 18 may further extract gesture information of the second object 222 and terminal movement information corresponding to the extracted terminal. Also, the similarity between the gesture information of the first object 221 and the terminal movement information corresponding to the extracted terminal is further applied in calculating the second location information similarity.

Further, the same object management unit 18 checks whether the second location information similarity exceeds the third preset threshold value, and determines that the first object 221 and the second object 222 are the same object when the second location information similarity exceeds the third preset threshold value.

Figure 3:
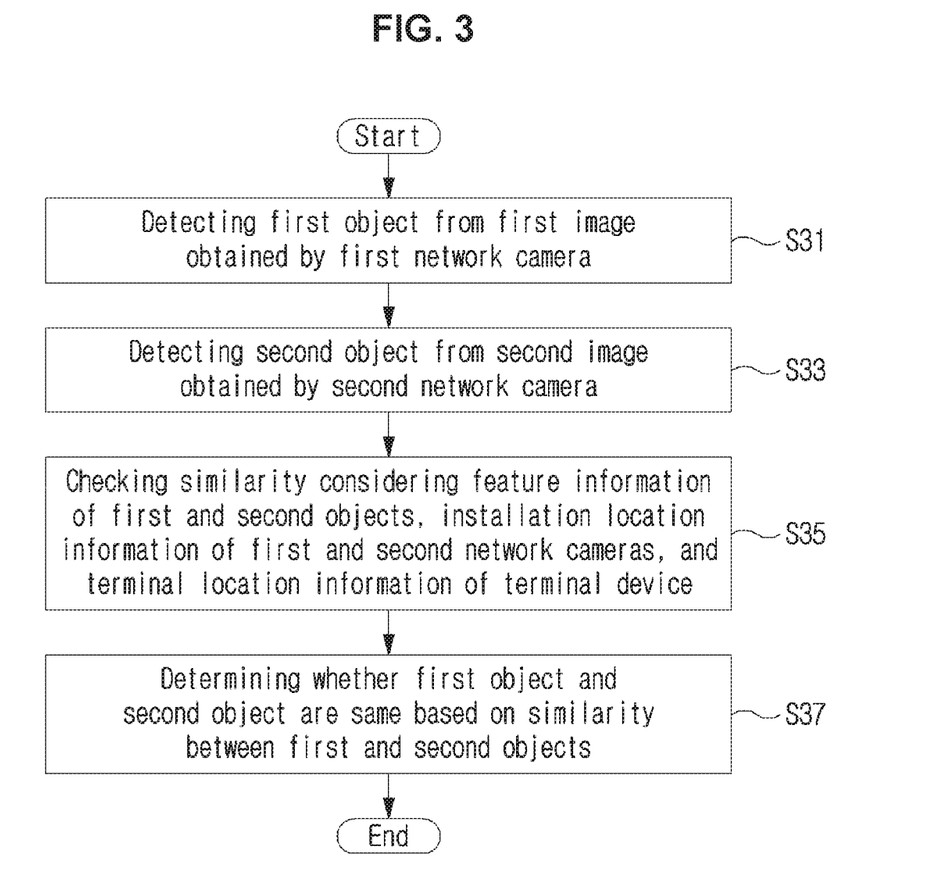
FIG. 3 is a flowchart illustrating an example of a sequence of a method of processing an object in an image according to an embodiment of the present disclosure.

FIG. 3 is a flowchart illustrating an example of a sequence of a method of processing an object in an image according to an embodiment of the present disclosure.

The method of processing the object in the image according to the embodiment of the present disclosure may be executed by the system for processing the object in the image.

The system for processing the object in the image may detect the first object from the first image obtained by the first network camera at step S31, and the system for processing the object in the image may detect the second object from the second image obtained by the second network camera at step S33.

Next, the system for processing the object in the image may check the similarity considering the feature information of the first and second objects, the installation location information of the first and second network cameras, the terminal location information of the terminal device, etc. at step S35.

Specifically, the detected first object and second object may be the same object or different objects. Accordingly, feature information of the first object and the second object is checked first, and the similarity between the first object and the second object is calculated. When the similarity between the first object and the second object exceeds the preset threshold value, the installation location information of the second network camera is checked and the terminal device in the location corresponding thereto is detected. Among the location information of the detected terminal device, the location information corresponding to the time when the second image is obtained is checked, and then the similarity between the checked terminal location information and the installation location information of the second network camera is checked.

Next, at step S37, the system for processing the object in the image determines, on the basis of the similarity checked at step S35, whether the first object and the second object are the same object. For example, when the similarity checked at step S35 is equal to or greater than the preset threshold value, it is determined that the first object and the second object are the same object. When the checked similarity is less than the preset threshold value, it is determined that the first object and the second object are different objects.

Figure 4:
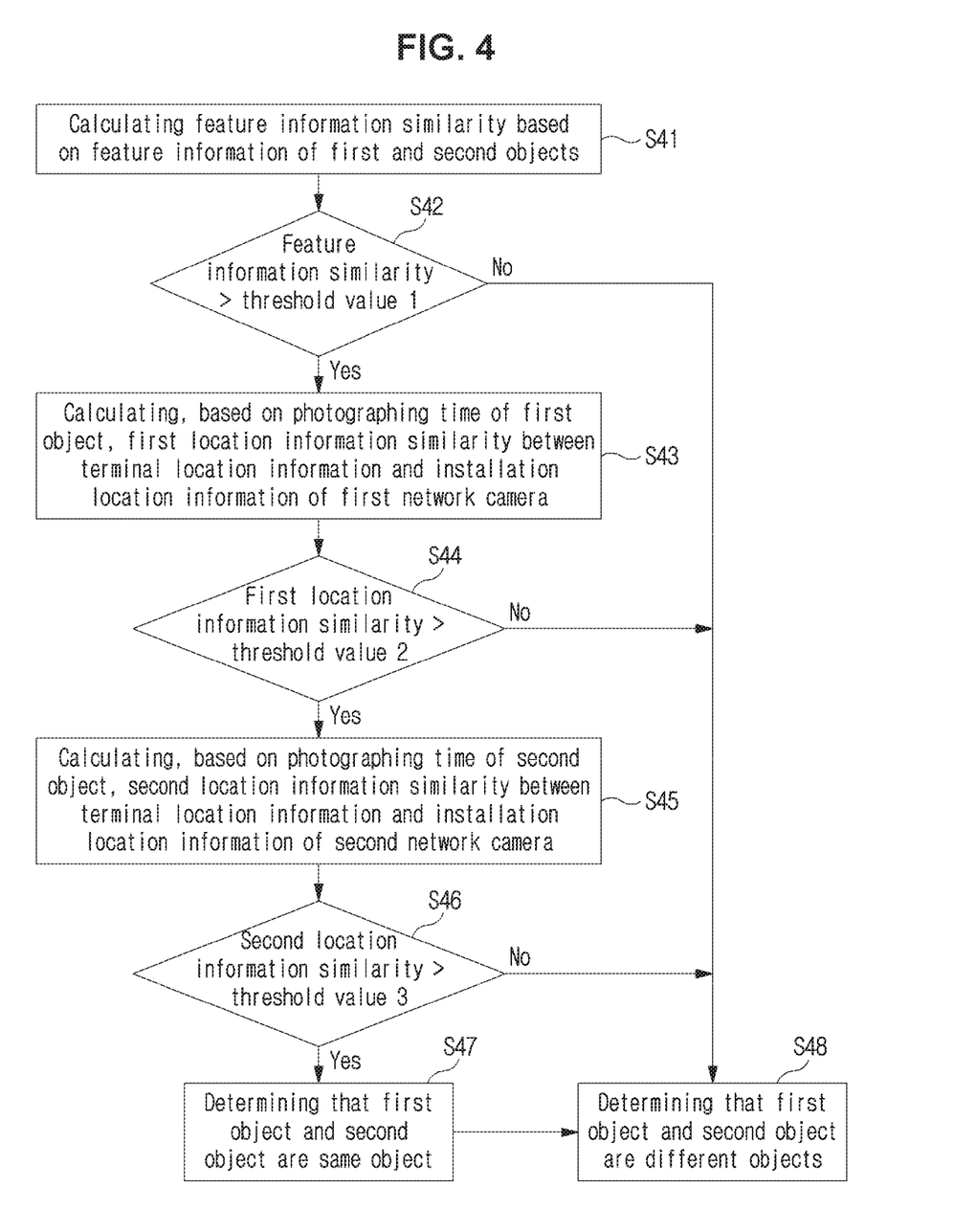
FIG. 4 is a flowchart illustrating an example of detailed operation at step S35 in FIG. 3.

FIG. 4 is a flowchart illustrating an example of detailed operation at step S35 in FIG. 3. Hereinafter, operation at step S35 will be described in detail with reference to FIG. 4.

First, at step S41, the system for processing the object in the image may detect feature information of the first object and feature information of the second object. For example, the system for processing the object in the image may check, among information stored in the object information DB, images on a per-object basis corresponding to the first object and the second object, and may detect the feature information of the first object and the feature information of the second object from the image on a per-object basis.

At step S41, the system for processing the object in the image may calculate the similarity between the feature information of the first object and the feature information of the second object.

At step S42, the system for processing the object in the image may check whether the similarity (hereinafter, referred to as "a feature information similarity") between the feature information of the first object and the feature information of the second object is equal to or greater than the first preset threshold value. When the feature information similarity is equal to or greater than the first preset threshold value, the process proceeds to step S43, and when the feature information similarity is less than the first preset threshold value, the process proceeds to step S48.

At step S43, the system for processing the object in the image checks the installation location information of the first network camera corresponding to the first object. Also, the system for processing the object in the image checks at least one piece of terminal location information detected at the same time (or similar time) based on the photographing time of the first object. Also, the system for processing the object in the image calculates the similarity (e.g., first location information similarity) between at least one piece of terminal location information and the installation location information of the first network camera.

At step S44, the system for processing the object in the image checks whether the first location information similarity is equal to or greater than the second preset threshold value. When the first location information similarity is equal to or greater than the second preset threshold value, the process proceeds to step S45, and when the first location information similarity is less than the second preset threshold value, the process proceeds to step S48.

At step S45, the system for processing the object in the image extracts at least one terminal device in which the first location information similarity is equal to or greater than the second preset threshold value. Among the terminal location information of at least one terminal device which is extracted, the terminal location information corresponding to the photographing time of the second object is extracted. The system for processing the object in the image calculates the similarity (e.g., second location information similarity) between the extracted terminal location information and the installation location information of the second network camera.

At step S46, the system for processing the object in the image checks whether the second location information similarity is equal to or greater than the third preset threshold value. When the second location information similarity is equal to or greater than the third preset threshold value, the process proceeds to step S47, and when the second location information similarity is less than the third preset threshold value, the process proceeds to step S48.

Steps S47 and S48 show detailed operation at step S37.

Since it is checked that the similarity of feature information based on images of the first object and the second object, and the first location information similarity and the second location information similarity based on location information history are equal to or greater than preset threshold values, the system for processing the object in the image determines that the first object and the second object are the same object at step S47.

In contrast, when it is checked that at least one of the similarity of feature information based on images of the first object and the second object, and the first location information similarity and the second location information similarity based on the location information history is less than the preset threshold value, the system for processing the object in the image determines that the first object and the second object are different objects at step S48.

Further, in the method of processing the object in the image according to the embodiment of the present disclosure, when calculating the similarity of the feature information, the system for processing the object in the image may further check the gesture information of the first object and the gesture information of the second object. Also, the system for processing the object in the image may apply the gesture information of the first and second objects in calculating the similarity of the feature information.

Also, when calculating the first location information similarity, the system for processing the object in the image may further extract movement information supporting movement of the corresponding terminal device. Also, the system for processing the object in the image may further apply the similarity between the gesture information of the first object and the terminal movement information of the terminal device in calculating the first location information similarity.

Similarly, when calculating the second location information similarity, the system for processing the object in the image may further extract movement information supporting movement of the corresponding terminal device. Also, the system for processing the object in the image may further apply the similarity between the gesture information of the second object and the terminal movement information of the terminal device in calculating the second location information similarity.

Figure 5:
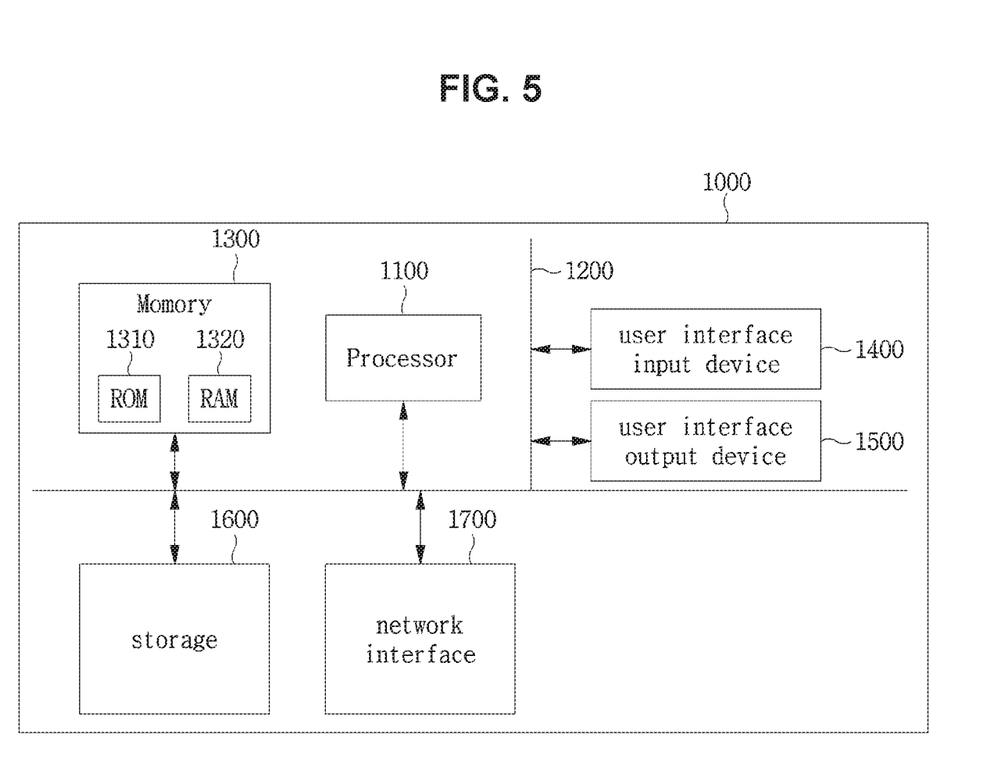
FIG. 5 is a block diagram illustrating an example of a computing system executing a method of processing an object in an image according to an embodiment of the present disclosure.

FIG. 5 is a block diagram illustrating an example of a computing system executing a method of processing an object in an image according to an embodiment of the present disclosure.

Referring to FIG. 5, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of processing an object in an image, the method comprising:
    detecting a first object from a first image obtained by a first network camera;
    detecting a second object from a second image obtained by a second network camera checking similarity between the first and second objects in consideration of feature information of the first and second objects, installation location information of the first and second network cameras, and location information of a terminal device; and
    determining whether the first object is equal to the second object on the basis of the similarity between the first and second objects,
    wherein the checking of the similarity between the first object and the second object comprises:
    firstly, checking the first similarity between the first location information and first installation location information indicating a location where the first network camera is installed and the second similarity between the second location information and second installation location information indicating a location where the second network camera is installed, and
    secondly, calculating the similarity between the first object and the second object when the first is equal to or greater than a preset threshold value and the second similarity is equal to or greater than the preset threshold value.

2. The method of claim 1, wherein the checking of the similarity between the first object and the second object comprises:
    checking first location information of the terminal device corresponding to a time when the first image is obtained; and
    checking second location information of the terminal device corresponding to a time when the second image is obtained.

3. The method of claim 1, wherein the checking of the similarity between the first object and the second object comprises:
    checking feature information similarity between first object and the second object on the basis of the feature information of the first and second objects; and
    checking first location information of the terminal device corresponding to a time when the first image is obtained and second location information of the terminal device corresponding to a time when the second image is obtained in consideration of the feature information similarity.

4. The method of claim 1, wherein the checking of the similarity between the first object and the second object comprises:
    checking first gesture information indicating a gesture of the first object; and
    checking second gesture information indicating a gesture of the second object.

5. The method of claim 4, wherein the checking of the similarity between the first object and the second object comprises: checking similarity between the first gesture information and the second gesture information.

6. The method of claim 4, wherein the checking of the similarity between the first object and the second object comprises: checking first movement information of the terminal device corresponding to a time when the first image is obtained and second movement information of the terminal device corresponding to a time when the second image is obtained.

7. The method of claim 6, wherein at the checking of the similarity between the first object and the second object, the similarity between the first and second objects is checked in consideration of image information of the first and second objects, the installation location information of the first and second network cameras, the location information of the terminal device, the first and second gesture information, and the first and second movement information.

8. A system for processing an object in an image, the system comprising:
    a first network camera obtaining a first image;
    a second network camera obtaining a second image;
    a camera information management unit managing installation location information indicating locations where the first and second network cameras are installed;
    an object information management unit detecting a first object from the first image and a second object from the second image;
    a terminal location information management unit storing and managing terminal location information indicating a location of a terminal device; and
    a same object management unit checking similarity between the first and second objects in consideration of feature information detected from the first and second objects, the installation location information of the first and second network cameras, and the terminal location information,
    wherein the same object management unit determines whether the first object and the second object are the same object on the basis of the similarity between the first and second objects, and
    wherein the same object management unit, firstly, checks the first similarity between the first location information and first installation location information indicating a location where the first network camera is installed and the second similarity between the second location information and second installation location information indicating a location where the second network camera is installed, and secondly, calculates the similarity between the first object and the second object when the first is equal to or greater than a preset threshold value and the second similarity is equal to or greater than the preset threshold value.

9. The system of claim 8, wherein the same object management unit is configured to,
    check first location information of the terminal device corresponding to a time when the first image is obtained; and
    check second location information of the terminal device corresponding to a time when the second image is obtained.

10. The system of claim 8, wherein the same object management unit is configured to,
- check feature information similarity between the first object and the second object on the basis of the feature information of the first and second objects; and
- check first location information of the terminal device corresponding to a time when the first image is obtained and second location information of the terminal device corresponding to a time when the second image is obtained in consideration of the feature information similarity.

11. The system of claim 8, wherein the object information management unit checks, stores, and manages first gesture information indicating a gesture of the first object and second gesture information indicating a gesture of the second object.

12. The system of claim 11, wherein the same object management unit checks similarity between the first gesture information and the second gesture information.

13. The system of claim 12, wherein the same object management unit checks first movement information of the terminal device corresponding to a time when the first image is obtained and second movement information of the terminal device corresponding to a time when the second image is obtained.

14. The system of claim 13, wherein the same object management unit checks the similarity between the first and second objects in consideration of the feature information of the first and second objects, the installation location information of the first and second network cameras, the terminal location information, the first and second gesture information, and the first and second movement information.

* * * * *